(12) United States Patent
Moudgill et al.

(10) Patent No.: US 7,171,438 B2
(45) Date of Patent: Jan. 30, 2007

(54) METHOD FOR RECOGNITION OF FULL-WORD SATURATING ADDITION AND SUBTRACTION

(75) Inventors: Mayan Moudgill, White Plains, NY (US); Vladimir Kotlyar, Stamford, CT (US)

(73) Assignee: Sandbridge Technologies, Inc., White Plains, NY (US)

( * ) Notice: Subject to any disclaimer, the term of this patent is extended or adjusted under 35 U.S.C. 154(b) by 727 days.

(21) Appl. No.: 10/382,578

(22) Filed: Mar. 7, 2003

(65) Prior Publication Data

US 2004/0181568 A1 Sep. 16, 2004

Related U.S. Application Data

(60) Provisional application No. 60/425,251, filed on Nov. 12, 2002.

(51) Int. Cl.
*G06F 7/38* (2006.01)

(52) U.S. Cl. ...................................................... 708/552

(58) Field of Classification Search ................ 708/498, 708/530, 552, 553
See application file for complete search history.

(56) References Cited

U.S. PATENT DOCUMENTS

| | | | |
|---|---|---|---|
| 4,656,583 A | | 4/1987 | Auslander et al. |
| 5,905,662 A | * | 5/1999 | Shiraishi ..................... 708/552 |
| 5,915,109 A | | 6/1999 | Nakakimura et al. |
| 6,631,392 B1 | * | 10/2003 | Jiang et al. ................. 708/498 |
| 6,687,898 B2 | * | 2/2004 | Chen et al. ................. 717/153 |

OTHER PUBLICATIONS

Glossner, J. et al.: "Trends in compilable DSP architecture," IEEE Workshop on Signal Processing Systems, pp. 1-19 (2000).

Batten, D. et al.: "A new approach to DSP intrinsic functions," Proceedings of the Hawaii Int'l Conference on System Sciences, pp. 1-10 (Jan. 2000).

Johnson, R. et al.: "Dependence-based program analysis," ACM SIGPLAN Notices, Ass'n for Computing Machinery, vol. 28, No. 6, pp. 78-89 (Jun. 1993).

Mark N. Wegman and F. Kenneth Zadeck, *Constant Propagation with Conditional Branches*, 1991, pp. 181-210.

Gary A. Kildall, *A Unified Approach to Global Program Optimization*, pp. 194-206.

(Continued)

*Primary Examiner*—Chuong D. Ngo
(74) *Attorney, Agent, or Firm*—Barnes & Thornburg LLP (57) ABSTRACT

A method of formulating and solving equations that facilitate recognition of full word saturating addition and subtraction The method includes formulating, for each basis addition statement $z=x+y$ or subtraction statement $z=x-y$, data flow equations that describe properties of the program statements being analyzed; and solving the data flow equations. The properties may include: (a) the values BITS of program variables as Boolean functions of the sign bits of x, y and z; (b) the condition COND under which program statements are executed as Boolean functions of the sign bits of x, y and z; and (c) the condition REACH of which values of variables reach any given use of z when overflow/underflow/neither occurs.

16 Claims, 2 Drawing Sheets

OTHER PUBLICATIONS

Patrick Cousot and Radhia Cousot, *Automatic Synthesis of Optimal Invariant Assertions: Mathematical Foundations*, pp. 1-12.

Ron Cytron, Jeanne Ferrante, Barry K. Rosen, Mark N. Wegman, F. Kenneth Zadeck, *An Efficient Method of Computing Static Single Assignment Form*, 1989, pp. 25-35.

Thomas M. Conte, Pradeep K. Dubey, Matthew D. Jennings, Ruby B. Lee, Alex Peleg, Salliah Rathnam, Mike Schlansker, Peter Song, Andrew Wolfe, *Challenges to Combining General-Purpose and Multimedia Processors*, 1997, pp. 33-37.

* cited by examiner

METHOD FOR RECOGNITION OF FULL-WORD SATURATING ADDITION AND SUBTRACTION

CROSS REFERENCE

The present application claims the benefit of the U.S. provisional application Ser. No. 60/425,251 entitled Method for Recognition of Full-Word Saturating Addition and Subtraction, filed Nov. 12, 2002, which is incorporated herein by reference.

FIELD OF THE INVENTION

A new method for recognition of full-word saturating addition and subtraction, in general and more specifically to a method based on solution of data-flow equations derived from the analyzed computer programs. This is in contrast to currently employed methods that are based on matching fixed patterns in program code.

BACKGROUND AND SUMMARY OF THE INVENTION

Reference made herein and listed at the end are incorporated herein as necessary for understanding and implementing of the present invention.

Saturating arithmetic is widely used in digital signal processing (DSP) applications. Full-word saturating arithmetic operations work by setting their result to a pre-defined maximum or minimum in those situations where the corresponding basic 2's complement operations overflow or underflow.

Modern digital signal processors provide fast implementations of saturating operations. At the same time, many DSP applications are written in a standard programming language (such as ANSI C) with saturating operations coded as subroutines or macros in terms of basic 2's complement operations. In order to provide fast execution of such programs it is important to have an optimizing compiler automatically recognize and convert code fragments to individual saturating operations whenever possible.

The prior art in compiling for digital signal processors with saturating operations can be divided into two categories: a) special data types or intrinsic functions are used to signal to the compiler which +/− operations should be treated as saturating; and b) pattern matching of program fragments is used to discover saturating operations. The task of automatically recognizing saturating operations is complicated by the fact that there are many ways of programming such operations. An optimizing compiler relying on simple pattern recognition would have to test for a large number of patterns.

The present invention solves the problem of recognizing saturating addition and subtraction by capturing the essence of these operations in a set of data-flow program analysis equations that can be solved using well-known techniques in the area of optimizing compilers (see Ref 1, 5, 6, 7).

The method of formulating and solving equations that facilitate recognition of full word saturating addition and subtraction, includes formulating, for each basis addition statement $z=x+y$ or subtraction statement $z=x-y$, data flow equations that describe properties of the program statements being analyzed; and solving the data flow equations.

The following properties of the program can be used:
(a) the values BITS of program variables as Boolean functions of the sign bits of x, y and z;
(b) the condition COND under which program statements are executed as Boolean functions of the sign bits of x, y and z; and
(c) the condition REACH of which values of variables reach any given use of z when overflow/underflow/ neither occurs.

The method includes replacing z in a statement S of the program that uses z with the use of $z_{sat}$ if and only if all of the following conditions hold for that statement S: a) the only values of z that reach S assigns SATMAX to z when overflow has occurred, c) the only values of z that reach S assigns SATMIN to z if underflow has occurred, and d) the only values of z that reaches S is from the basis statement A if no underflow and no overflow has occurred. Finally the statements made unnecessary by the replacement of uses of z with $z_{sat}$ are removed.

The equations for BITS, COND and REACH may use dense techniques or sparse program representation. The method values and conditions are approximated using global data flow analysis, which includes a lattice for approximating the properties (the values and conditions BITS, COND, REACH) and a system of equations relating approximations to various program points. Lattice vectors assigned to the variables can be compressed.

The REACH properties include a constant value $C_{OF}(E,v)$ taken by the variable v when the edge E is executed, if overflow had occurred; a constant value $C_{UF}(E,v)$ taken by the variable v when the edge E is executed, if underflow had occurred; and a Boolean flag $ISZ(E,v)$ which indicates whether v carries the same value as the variable z in the basis statement A when the edge E is executed and neither overflow nor underflow had occurred.

These and other aspects of the present invention will become apparent from the following detailed description of the invention, when considered in conjunction with accompanying drawings.

DETAILED DESCRIPTION OF THE PREFERRED EMBODIMENTS

First is a description of how program are represented for the purposes of deriving the equations. The notion of full-word saturating addition and subtraction is formalized. Next, how the systems of equations are formulated and present an algorithm for recognition of full-word saturating addition and subtraction is described.

Program Representation

The source language programs are decomposed into individual procedures. The present technique is an intra-procedural in that it works on one procedure at a time, independently of others. Herein, the terms "program" and "procedure" are used interchangeably.

Each procedure is represented using its Control-Flow Graph (CFG). The nodes in the graph are program statements. The edges in the graph represent possible transfer of program flow between statements. It is assumed that compound expressions in assignment statements have been translated into sequences of simple assignment statements that involve only a single operator each. Such representation is standard and is referred to in the literature as three-address form (Ref 1).

There are four kinds of program statements:

1. The unique entry statement.

2. Assignment statements compute new values through arithmetic operations, perform memory loads or stores, or perform procedure calls. Without loss of generality, the description will be restricted to the assignment statements enumerated below.

Arithmetic operations $OP_B$ (x, y) are parameterized by bit width. For example, signed addition of 8 bit integer values is translated into $add_8$ (x, y). The arithmetic operations include saturating addition $addsat_B$ and subtraction $subsat_B$. These are not present in the initially lowered source program.

3. Control statements provide alternative directions in program flow. Without loss of generality, assume that there is only two kinds of control statement: $IF_B(v)$ and RETURN. Switch statement $IF_B(v)$ has two descendants in the Control Flow Graph and transfers the control to the first one if the value of v, taken as a B bit integer, is non-zero, and to the second one, otherwise. Other kinds of control-flow statements (e.g. loops, multi-way switches) can be translated into sequences of assignment statements and IF statement.

There can only be one RETURN statement in a procedure. It indicates that the program control should be transferred to the calling procedure. Optionally, it can specify a value to return: RETURN(v).

4. Merge statements are points where alternative paths in program execution merge.

Observe the following facts about such representation:

Assignment statements have exactly one incoming and one outgoing edge. The notation IN(S) and OUT(S) denote the incoming and outgoing edges, respectively, for an assignment statement S. PRE(S) and SUCC(S) denote the predecessor and successor statements, respectively.

The entry statement has no incoming edges and has exactly one outgoing edge. IN(S) and PRE(S) are meaningless for an entry statement. OUT(S) and SUCC(S) have the same meaning as for the assignment statements.

Control statements (IF and RETURN) each have exactly one incoming edge. A switch or IF has exactly two outgoing edges: OUT(S, true) and OUT(S, false)—for the true and false directions in the program. RETURN has no outgoing edges. IN(S) and PRE(S) have the same meaning for control statements as for assignment statements. For IF statements, SUCC(S, true) is the node that follows on the "true" direction and SUCC(S, false) is the node that follows on the "false" direction.

Merge statements have exactly one outgoing edge and can have many incoming edges. OUT(S) and SUCC(S) denote the outgoing edge and the successor statement. For join statements, IN(S) and PRE(S) denote sets of incoming edges. Assume that all merge statements have exactly two incoming edges. This simplifies the equations, but does not change the nature of the invention.

Possible kinds of assignment statements and their descriptions are listed in the table below:

| Statement | Description |
|---|---|
| $a=addsat_B(b,c)$<br>$a=subsat_B(b,c)$ | B-bit saturating addition and subtraction (mathematically defined below). addsat and subsat not present in the source program. |
| $a=OP_B(b,c)$,<br>where OP is one of:<br>add, sub, mul, and,<br>or, xor, shl, shr,<br>shra | Binary B-bit operations: addition, subtraction, multiplication, bitwise and, bitwise or, bitwise exclusive or, shift left, shift right, shift right arithmetic (with sign extension).<br>2's complement notation is used for arithmetic operations.<br>(Observe that sign negation and bit inversion can be defined using sub and xor.)<br>shra denotes arithmetic shift right with the sign bit copied rightward. $shra_B(-1,1)=-1$, always.<br>shr denotes unsigned shift right:<br>$shr_B(-1,1)=2^{(B-1)}-1$ |
| $a=exts_{B,A}(b)$ | Sign extends the B bit value b into A bits. If A < B, then the lowest order A bits of b are returned |
| $a=extz_{B,A}(b)$ | Zero extends the B bits value b into A bits. If A < B, then the lowest order A bits of b are returned. |
| $a=cmpeq_B(b,c)$<br>$a=cmpne_B(b,c)$ | Comparisons of B-bit integers: equality and inequality.<br>The result is a single condition bit. |
| $a=cmplt_B(b,c)$<br>$a=cmple_B(b,c)$ | Signed B-bit comparisons using 2's complement notation: less-that, less-that-or-equals.<br>(Other signed comparisons can be re-written using these two.) |
| $a=ucmplt_B(b,c)$<br>$a=ucmple_B(b,c)$ | Unsigned B-bit comparisons. |
| a=constant | Copying of a B-bit constant into the variable |
| NOP | A null operation |
| $store_B$ a, b | Store the lowest B bits of the variable a in the memory location given by variable b. |
| $a=load_B$ b | Load the lowest B bits at memory location given by b are put into variable a. |
| a=& b | Put the address of the variable b into the variable a. |
| a=CALL F(b, c, ....)<br>CALL F(b,c, ...) | A procedure call, either returning a value or not. |
| a=UNDEF | A special statement indicating that the value of the variable is modified in an unknown way.<br>These statements are inserted as result of inter-procedural analysis and aliasing analysis in order to determine which calls and stores potentially modify which values (Ref 2).<br>Given the state-of-the-art in compilers, it is assumed that such analysis has been performed and the UNDEF statements have been inserted, as the result. |

DEFINITION OF FULL-WORD SATURATING OPERATIONS

Full-word saturating addition and subtraction are defined relative to the basic B-bit 2's complement addition and subtraction as follows:

| | |
|---|---|
| $addsat_B(x,y) =$ | $SATMIN_B$, if $add_B(x,y)$ underflows<br>$SATMAX_B$, if $add_B(x,y)$ overflows<br>$add_B(x,y)$, otherwise |
| $addsat_B(x,y) =$ | $SATMIN_B$, if $sub_B(x,y)$ underflows<br>$SATMAX_B$, if $sub_B(x,y)$ overflows<br>$sub_B(x,y)$, otherwise |

Where the saturation values SATMIN and SATMAX are the smallest and largest numbers, respectively, that can be represented using B-bit 2's complement arithmetic:

$$SATMIN_B = -2^{(B-1)}$$
$$SATMAX_B = 2^{(B-1)}-1$$

Problem

There are many possible ways of programming the full-word ADDSAT and SUBSAT operators in a high-level programming language such as ANSI C. Below are some possible (but not exclusive) implementations of ADDSAT:

```
int Add_Saturated_1(int x, int y) {
    int z = x + y;
    if ((x > 0) && (y > 0) && (z < 0)) {
        z = SATMAX;    /* overflow */
    }
    else if ((x < 0) && (y < 0) && (z > 0)) {
        z = SATMIN;    /* underflow */
    }
    return z;
}
int Add_Saturated_2(int x, int y) {
    int z = x + y;
    int sign_x = x & SATMIN;   /* 1000...000 if negative */
    int sign_y = y & SATMIN;
    int sign_z = z & SATMIN;
    if (!sign_x && !sign_y && sign_z) {
        z = SATMAX;    /* overflow */
    }
    else if (sign_x && sign_y && !sign_z) {
        z = SATMIN;    /* underflow */
    }
    return z
}
int Add_Saturated_3(int x, int y) {
    int z = x + y;
    int sign_x = x & SATMIN;   /* 1000...000 if negative */
    int sign_y = y & SATMIN;
    int sign_z = z & SATMIN;
    if ( (~(sign_x ^ sign_y)) & (sign_x & sign_z) ) {
        z = sign_x ? SATMIN : SATMAX;
    }
    return z;
}
int Add_Saturated_4(int x, int y) {
    int z = x + y;
    int sign_x = x & SATMIN;   /* 1000...000 if negative */
    int sign_y = y & SATMIN;
    int sign_z = z & SATMIN;
    if ( (SATMIN ^(sign_x ^ sign_y)) & (sign_x & sign_z) ) {
        z = SATMAX + ((x >> 31) & 0x1);
    }
    return z;
}
int Add_Saturated_5 (int x, int y) {
    int z = x + y;
    int OF=(~x & ~y & z) >> 31;   /* arithmetic shift !*/
    int UF=(x & y & ~z) >> 31;
    int N=~(OF | UF);
    return (MAX32 & OF) | (MIN32 & UF) | (z & N);
}
```

The above program fragments differ in the way they test for the combinations of the sign bits of x, y and z in order to detect overflow and underflow.

In general, a program in three-address intermediate form that does not contain ADDSAT and SUBSAT operations is provided. The goal is to recognize program fragments that can be replaced with ADDSAT and SUBSAT operations.

Program Analysis Techniques

Let G=(N, E) be the control-flow graph. N is the set of nodes (statements), and E is the set of edges. Let v be the set of variables in the program.

The algorithm proceeds by computing, for each addition statement $add_B$ (x, y), the set of uses of the assigned variable z that receive the saturated value. The addition statement under consideration is the basis statement. The variables x, y and z involved in the basis statement are the basis variables. The uses that receive the saturated value of z is the saturated uses. The sign bits of x, y and z are the basis sign bits and are referred to as X, Y and Z, respectively.

In order to identify saturated uses, the values of variables and the conditions under which statements are executed as Boolean functions are represented in terms of the basis sign bits in the basis statement. Also computed are values which reach a given use in the case of overflow, underflow or normal execution.

Given a basis statement, the present algorithm computes for the edges E and the variables v in the program the following properties:

BITS(E,v) is the vector of Boolean functions in terms of the basis sign bits, one function per bit of v. It describes the value of the variable at edge E.

$C_{OF}$(E,v) is the constant value (if any) taken by the variable v when the edge E is executed, if overflow had occurred.

$C_{UF}$(E,v) is the constant value (if any) taken by the variable v when the edge E is executed, if underflow had occurred.

ISZ(E,v) is the Boolean flag which says whether v carries the same value as the variable z in the basis statement when the edge E is executed and neither overflow nor underflow had occurred.

COND(E) is the condition, in terms of the basis sign bits, under which the edge E is executed.

$C_{OF}$, $C_{UF}$ and ISZ as a group are considered REACH properties or conditions indicating which values of the variable v reaches a use of variable z in statement S at edges E in the program for overflow or underflow or normal occurrences. They are used directly to identify saturated uses. A variable v used in an assignment or a switch statement receives a saturated value if all of the following conditions are satisfied:

$C_{OF}$(IN(S),v)=$SATMAX_B$ or COND(IN(S), $F_{OF}$)=0
$C_{UF}$(IN(S),v)=$SATMIN_B$ or COND(IN(S), $F_{UF}$)=0
ISZ(IN(S),v)=1 or COND(IN(S), $F_N$)=0

In the following subsection, the lattices used in the formulation and solution of data-flow equations for the properties are defined. Then, the equations relating the properties and the source program are described.

The Lattices

The following three lattices are used:

The $C_{OF}$ and $C_{UF}$ properties are defined on the lattice $\Lambda$const used in constant propagation [6]). $\Lambda_{const}$={T, $\bot$}$\cup$Z.

ISZ is defined on the two value Boolean lattice $\Lambda_{bool}${0, 1}. The meet operator $\Pi$bool is Boolean conjunction: $0\Pi_{bool}1=0\wedge1=0$. The values are ordered by 0<1.

BITS and COND properties use the lattice $\Lambda$ formed out of Boolean predicates of three variables. $\Lambda$ is described in detail below and is referred to simply as "the lattice" and explicitly qualify the other two lattices.

Lattice for Approximating Boolean Functions

Let X, Y, Z be the sign bits of the variables x, y, z, respectively. Let F be the set of all possible Boolean functions (predicates) in three variables X, Y, Z. 0 denotes the trivially false predicate: 0(X,Y,Z)=0. 1 denotes the trivially true predicate: 1(X,Y,Z)=1.

The lattice for approximating Boolean predicates is $\Lambda = F \cup \{T, \bot\}$. The comparison operator $<$ on $\Lambda$ is defined as: $\bot < F < T$, for all $F \in F$. The meet operator $\Pi$ is defined as:

$F \Pi G = \bot$, for all F, $G \in F$, $F \neq G \lambda \Pi \bot = \bot$ and $\lambda \Pi T = \lambda$, for all $\lambda \in \Lambda$ The Boolean operations (and $\wedge$, or $\vee$, xor $\oplus$) are extended to elements of lattice $\Lambda$, as follows (observe that $\underline{1} \oplus F = \neg F$, so xor subsumes bit inversion), in the order of precedence of the rules:
(a) $\lambda_1$ op $\lambda_2 = F_1$ op $F_2$, if $F_1, F_2 \in F$, for all Boolean operations
(b) $\underline{1} \vee \lambda = \underline{1}$ and $\underline{0} \wedge \lambda = \underline{0}$, for all $\lambda \in \Lambda$
(c) $\bot$ op $\lambda = \bot$ and T op $\lambda = T$, for all $\lambda \in \Lambda$ and for all Boolean operations Lattice Vectors $\Lambda^B$ is the set of all vectors of length B of lattice elements. The elements of such vectors are numbered from 0 to (B−1) and displayed with the element (B−1) on the left, as in: $[V_{(B-1)}, V_{(B-2)}, \ldots, V_1, V_0]$. (B−1) is the position of the sign bit. $F^B$ is the se vectors of length B of Boolean predicates. Clearly, $F^B \subseteq \Lambda^B$.

The meet operation $\Pi$ is extended to the vectors as:

$[V_{B-1}, \ldots, V_0] \Pi [U_{B-1}, \ldots, U_0] = [V_{B-1} \Pi U_{B-1}, \ldots, V_0 \Pi U_0]$ Evaluation and Application of Lattice Vectors It is convenient to treat vectors of bits as vectors in $F^B$. For a vector $V = [V_{B-1}, \ldots, V_0]$, the function eval(V) is defined to be the integer formed from the predicates $V_k$, if they are all either $\underline{0}$ or $\underline{1}$. If any of the vector elements are not $\underline{0}$ or $\underline{1}$, then eval(V)=$\bot$. For example, eval($[\underline{0},\underline{1},\underline{0},\underline{1}]$)=5 and eval($[X \wedge Y, \underline{0},\underline{0},\underline{0},]$)=$\bot$.

Given a vector of predicates $V = [V_{B-1}, \ldots, V_0] \in F^B$, the application V(X,Y,Z) of V to the given values of the sign bits X, Y, Z is defined as the vector of bits:

$V(X,Y,Z) = [V_{B-1}(X,Y,Z), \ldots, V_0(X,Y,Z)]$.

I.e., the "application of a vector" is "the vector of applications". The application of a vector V of lattice values to a predicate F is defined as:

$V(F) = V(X_1,Y_1,Z_1) \Pi \ldots \Pi V(X_m,Y_m,Z_m)$, with the meet operator $\Pi$ taken over all $X_k, Y_k, Z_k$ such that $F(X_k, Y_k, Z_k)$ is true.

Also, the inverse of eval function: $V = ieval_B(C)$ is defined as vector $V \in F^B$ of bits, such that $C = eval(V)$. For example, $ieval_4(3) = [\underline{0},\underline{0},\underline{1},\underline{1}]$ and $ieval_4(-3) = [\underline{1},\underline{1},\underline{0},\underline{1}]$. The ieval function extended to the $\Lambda_{const}$ lattice: $ieval_B(\bot) = [\bot, \bot, \ldots, \bot]$; $ieval_B(T) = [T, T, \ldots, T]$.

Extension of Arithmetic Operations to Lattice Vectors

The B-bit arithmetic operations are extended to operations on vectors of lattice elements. Let $U = [U_{(B-1)}, \ldots, U_0]$ and $V = [V_{(B-1)}, \ldots, V_0]$ be two vectors of lattice elements abstracting the values of the variables u and v. Let $w = op_B(u, v)$ be a B bit arithmetic operation on the variables. The bits of the result w are computed by applying a sequence of basic Boolean operations to the bits of the inputs u and v. The operation $op_B$ is extended to $\Lambda^B$ by performing on the elements of the input vector the same sequence of Boolean operations extended to $\Lambda$. The extended operation is $\underline{op_B}$.

For example, if the operation is B-bit addition (ADD), then the rules for deriving the value of the result vector mimic the rules for addition with carry:

Let $C = \underline{0}$ (this is the carry bit)
For k from 0 to B−1:

$W_k = U_k \oplus V_k \oplus C$ $C = (C \wedge (U_k \vee V_k)) \vee (U_k \wedge V_k)$ For multiply operation, precise bit-wise definition, while possible, is not helpful, and thus the result of the multiply operation is defined to be the vector of all bottoms $W = [\bot, \bot, \ldots, \bot]$.

Another example is the $v = NOTZERO_B(u)$ operation. The vector V for the variable v has exactly one element: $V = [V_0]$. $U = [U_{(B-1)}, \ldots, U_0]$. The vectors are related as:

$V_0 = U_{(B-1)} \vee U_{(B-2)} \vee \ldots \vee U_0$

The extension of other operations is straightforward.

Data Flow Properties

In the derivation of the data flow equations, the following notation for the overflow, underflow and no-overflow-and-no-underflow ("neither") predicates are used:

If the basis statement is addition:

$F_{OF} = \neg X \wedge \neg Y \wedge Z$ $F_{UF} = X \wedge Y \wedge \neg Z$

If the basis statement is subtraction:

$F_{OF} = \neg X \wedge Y \wedge Z$ $F_{UF} = X \wedge \neg Y \wedge \neg Z$ $F_N = \neg F_{OF} \wedge \neg F_{UF}$ BITS and COND Property Definitions For every edge E in the program control flow graph and for every variable v, the vector valued property BITS(E,v) $\in \Lambda^B$ is defined. Let BITS(E,v) = $[V_{(B-1)}, \ldots, V_0]$. The values of the vector elements are interpreted as follows:

If $V_k \in \{\underline{1}, \underline{0}\}$, then the k-th bit of the variable v is always constant when control passes over the edge E ("when E is executed").

If $V_k = F \in F - \{\underline{1}, \underline{0}\}$, then the following holds
  The basis statement dominates (see Ref 1) the edge E
  The value of the k-th bit of the variable v equals F(X,Y,Z) when E is executed for the values of X, Y, Z obtained at the most recent execution of the basis statement preceding the execution of E.

If $V_k = \bot$, then the exact value for the bit as a function of X, Y, Z we cannot be determined.

If $V_k = T$, then the value of the approximation for this bit is yet undetermined. This value is used at intermediate stages of iterative solution of data flow equations, but it does not appear in the final solution.

The subscript notation BITS(E,v)$_k$ is used to denote the k-th bit of the BITS(E,v) property.

For every edge E in the program graph, the defined condition property COND(E) $\in \Lambda$ is interpreted as follows:
If COND(E) = $F \in F$, then the following holds
  The edge E is dominated by the basis statement
  If the basis statement is executed and F(X,Y,Z) = 1 (is true), for the values of X, Y, Z just after the basis statement is executed, then E is executed at some later point.
If COND(E) = $\bot$, then the condition under which E is executed can not determined.
If COND(E) = T, then the condition under which E is executed is yet to be determined.

Equations for BITS and COND

The equations for BITS and COND properties are formed from the control flow graph, according to the following rules:

The equations for the basis statement S are:
  BITS(OUT(S), z)=[Z, ⊥,⊥ ... , ⊥]
  BITS(OUT(S), x)=[X, [⊥,⊥ ... , ⊥]
  BITS(OUT(S), y)=[Y, [⊥,⊥ ... , ⊥]
  COND(OUT(S))=1
  BITS(OUT(S),v)=BITS(IN(S),v), for all v∈v−{x,y,z}

The equations for the entry statement S are:
  BITS(OUT(S), v)=[⊥, ... , ⊥], for all v∈v
  COND(OUT(S))=⊥

For every merge statement S, form equations as follows: Let $E_0$ and $E_1$ be the incoming edges of S
  Let $E_0$ and $E_1$ be the incoming edges of S
  For every variable v∈v: BITS(OUT(S),v)=BITS($E_0$,v) ΠBITS($E_m$,v).
  COND(OUT(S))=COND($E_0$)∧COND($E_1$)

For every switch statement S of the form $IF_B(v)$, create equations as follows:
  Let BITS(IN(S), v)=[$V_{(B-1)}$, $V_{(B-2)}$, ... , $V_0$]
  Let P=$V_{(B-1)}$∧ ... ∧$V_0$(the true branch is taken when v is non-zero)
  COND(OUT(S, true))=COND(IN(S))∧P
  COND(OUT(S, false))=COND(IN(S))∧∧¬P
  For every variable v∈v, for all k∈[0,B−1]:
    BITS(OUT(S, true), v)$_k$=BITS(IN(S),v)$_k$
    BITS(OUT(S, false), v)$_k$=BITS(IN(S),v)$_k$ For every assignment statement S, other than the basis statement, of the form p=OP(q,r) where OP is an arithmetic operation:
  BITS(OUT(S),p)=OP(BITS(IN(S),q), BITS(IN(S),r)), where OP denotes the extension of the arithmetic operation OP to the vectors of lattice elements.
  BITS(OUT(S),v)=BITS(IN(S),v),for all v∈v−{p}.

Other assignments to a variable p, including loads and calls:
  BITS(OUT(S),p)=[⊥,⊥, ... ,⊥]
  BITS(OUT(S),v)=BITS(IN(S),v), for all v∈v−{p}

$C_{OF}$ AND $C_{UF}$ Properties

The equations for the $C_{OF}$ and $C_{UF}$ properties are as follows.

For the basis statement and the entry statement:
  $C_{OF}$(OUT(S),v)=$C_{UF}$(OUT(S),v)=⊥,
  for all variables v (including x, y, z)

For an assignment statement S of the form w=OP(u, v):
  Let U=BITS(IN(S),u), V=BITS(IN(S),v)
  $C_{OF}$=eval(OP(U($F_{OF}$), V($F_{OF}$)))
  $C_{UF}$=eval(OP(U($F_{UF}$), V($F_{UF}$)))

These rules have the following intuition: try to obtain the constant values, if any, that bits of the input variables carry. The vector/predicate evaluation expressions, U($F_{OF}$), etc., perform just that. Then apply the operation to the resulting bits and see if a constant can be formed out of the result.

For example, consider the code fragment (assuming x is one of the operands in the basis statement, and the basis statement is 32-bit addition).

t1=(x>>31) & 0x1;
z=0x7fffffff+t1;

The BITS value for the t1 variable is [0,0, ... ,0,X], since t1 get the sign bit of x shifted to the right. The BITS value for the constant is [0,1,1, ... ,1]. The $C_{OF}$ and $C_{UF}$ values are:

$C_{OF}$=eval(add32([0,0, ... ,0,X]($F_{OF}$), [0,1,1, ... , 1]($F_{OF}$)))=eval(add32([0,0, ... , 0,0], [0,1,1, ... , 1]))=eval([0,1,1, ... , 1])=0x7fffffff=$MAX_{32}$ $C_{UF}$=eval(add32([0,0, ... ,0,X]($F_{UF}$), [0,1,1, ... , 1]($F_{UF}$)))=eval(add32([0,0, ... , 0,1], [0,1,1, ... , 1]))=eval([1,0,0, ... , 0])=0x80000000=MIN This is how [0,0, ... ,0,X]($F_{OF}$) and [0,0, ... ,0,X]($F_{UF}$) are computed. Since it is assumed that the basis statement is addition, $F_{OF}$ is true when X=Y=0 and Z=1. $F_{UF}$ is true when X=Y=1 and Z=0. Therefore, in order to apply the vector [0,0, ... ,0,X] to $F_{OF}$, its elements are evaluate (they are all Boolean functions) for X=Y=0 and Z=1. This gives only one vector of bits: [0,0, ... ,0,0]. Similarly, [0, 0, ... , 0,X]($F_{UF}$)=[0,0, ... ,0,1].

At switches, the value for $C_{OF}$ and $C_{UF}$ are propagated to the outgoing edges. At merge statements, the equations are formed as follows. Let $E_0$ and $E_1$ be the two incoming edges for a merge statement S. Then:

If (COND($E_k$)∧$F_{OF}$)∈{0,T},
  then $C_{OF}$(OUT(S),v)=$C_{OF}$($E_{1-k}$,v), for k=0,1;
  otherwise $C_{OF}$(OUT(S),v)=$C_{OF}$($E_0$,v)Π$C_{OF}$($E_1$,v)

If (COND($E_k$)∧$F_{UF}$)∈{0,T},
  then $C_{UF}$(OUT(S),v)=$C_{UF}$($E_{1-k}$,v), for k=0,1;
  otherwise $C_{UF}$(OUT(S),v)=$C_{UF}$($E_0$,v)Π$C_{UF}$($E_1$,v)

The rules state that if one of the incoming edges is executed only when overflow/underflow occurs or its condition has not yet been determined, then the value from the opposite edge is propagated.

ISZ Property

The rules for the ISZ property are:
For the entry statement S: ISZ(OUT(S),v)=0, for all variables v
For the basis statement S: ISZ(OUT(S),z)=1; ISZ(OUT(S), v)=0, for all other variables
For any other assignment statement S of the form w=op (u, v):
  Let a=eval(BITS(IN(S),u)($F_N$)); b=eval(BITS(IN(S),v) ($F_N$))
  If a is a constant such that op(a,v)=v, then ISZ(OUT(S), w)=ISZ(IN(S),v)
  If b is a constant such that op(u,b)=u, then ISZ(OUT(S), w)=ISZ(IN(S),u)
  Otherwise ISZ(OUT(S),w)=0

This rules state that if the assignment statement really acts as a copy operation under the neither-overflow-nor-underflow condition, then the value of ISZ is propagated.

For all outgoing edges E of a switch statement S: ISZ(E,v)= ISZ(IN(S),v), for all variables v For a merge statement S with incoming edges $E_0$ and $E_1$ and the outgoing edge E:
  If (COND($E_k$)∧$F_N$)∈{0,T}, then ISZ(E,v)=ISZ($E_{k-1}$,v), for k=0,1, for all variables v.
  Otherwise ISZ(E,v)=ISZ($E_0$,v)∧ISZ($E_1$,v). (Recall, that ∧is the meet operator for ISZ)

In summary, variables inherit the ISZ property through copies. If one side of a merge statement can only be executed either under overflow or underflow, then the ISZ property is propagated from the opposite side.

Algorithm

Figure 1:
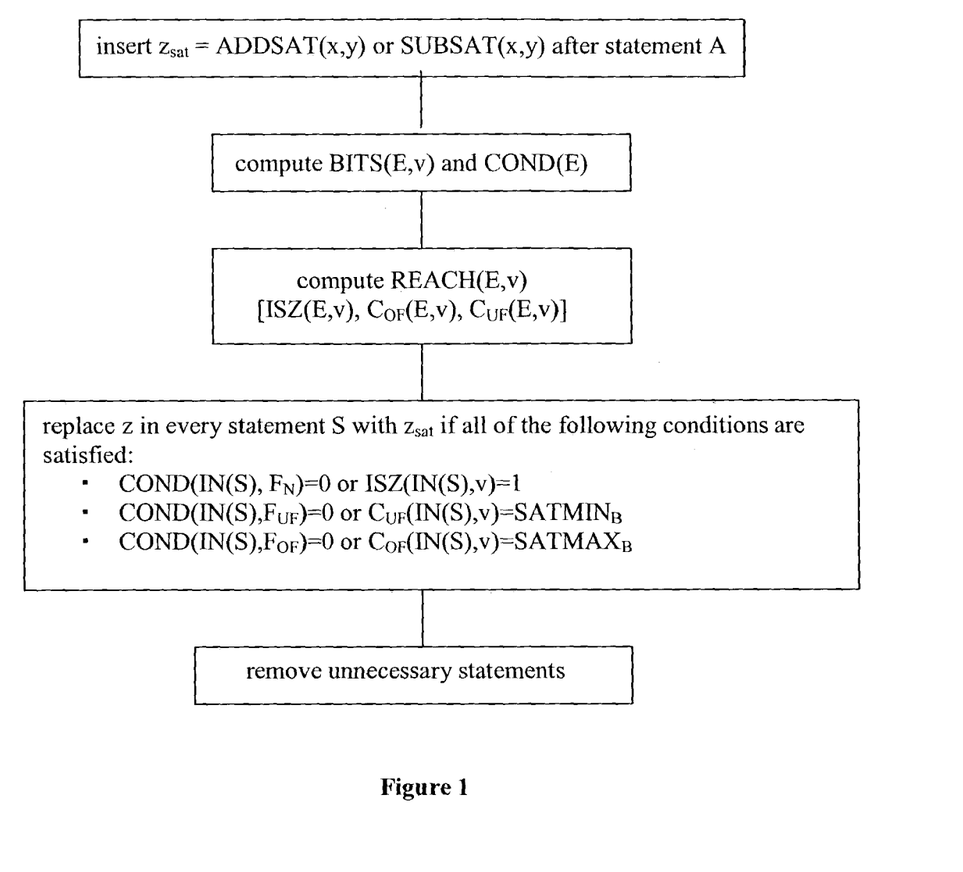
FIG. 1 is a flow chart of a method incorporating the principles of the present invention.

The overall algorithm for recognizing full-word saturating addition and subtraction is listed below and illustrated in FIG. 1. The algorithm is independent of the technique used to solve the data flow equations (see Ref 1, 5, 6, 7).

```
RecognizeAddsatAndSubsat (CFG G) {
    Initialize A to the set of all addition and subtraction
        statements in G;
    while (A ≠ Ø) {
        S=some member of A; A=A-{S};
        /* S is of the form z=add_B(x,y)or z=sub_B(x,y) */
        Let B be the bit width of S;
        Append, after S, the statement S' of the form
            zsat=addsat_B(x,y);
        Compute BITS, COND properties
            (using any applicable technique);
        Compute C_OF, C_UF and ISZ properties
            (using any applicable technique);
        ReplaceSaturatedUses(G, S, S', B);
        Perform dead code elimination;
        Let R be the set of eliminated statements;
        A=A-R;
    }
}
ReplaceSaturatedUses (CFG G, Stmt S, Stmt S', int B) {
    Let X, Y, Z be the basis sign bits in S;
    Let F_OF be the overflow predicate;
    Let F_UF be the underflow predicate;
    Let F_N=¬F_OF∧¬F_UF be the "neither" or "normal" predicate;
    Let SATMAX_B=2^(B-1)-1; SATMIN_B=-2^(B-1);
    for all assignment and switch statements H {
        for all variables v used in H {
            Let E=IN(H)
            The use is saturated if ALL of the following
                conditions are satisfied:
            (a) COND(E)∧F_N=0 or ISZ(E,v)=1
            (b) COND(E)∧F_OF=0 or C_OF(E,v)=SATMAX_B
            (c) COND(E)∧F_UF=0 or C_UF(E,v)=SATMIN_B
            If the use is saturated,
                replace v with zsat (from S')
        }
    }
}
```

Implementation Details

The following describes the details of an implementation:

Representing Boolean Predicates

We need a efficient way to manipulate Boolean predicates, since they are at the core of our method. A Boolean predicate of three variables can be represented using an 8-bit integer. There are $2^3=8$ combinations of the values of the arguments of the function. The integer has a bit for every combination of the input variables. Boolean operations on three-input Boolean functions are isomorphic to bitwise operations on 8-bit integers.

Compressing Vectors of Predicates

Usually we are interested only a single bit of each value. For the variables x, y and z in the basis statement, this is the highest-order bit (the sign bit). For variables that are the results of comparisons, this is the lowest order bit. It is possible that intermediate values will carry some combination of the sign bits shifted to other positions. We speed up analysis by compressing vector values of the BITS property into triplet of the form: <k,λ,flag>, where:

k is the position of the "interesting" bit
λ is the lattice value for this position
flag indicates the other bits in the value are all 0, all 1, all λ, or otherwise Data flow equations can be trivially modified to accommodate this representation. In effect, this representation performs lossy compression on the original vectors of lattice values, with no degradation in recognition due to the compression.

Conditional Propagation

Wegman-Zadeck style conditional propagation is used in the computation of the BITS and COND properties. The changes are straightforward and are analogous to the conditional propagation algorithm in Reference 7. During evaluation of merge statements, the meet operator is taken over the incoming edges, which are known to be executed. Herein, these are the edges E for which COND(E) is not T or 0. During evaluation of switch statements, the outgoing edge E for which COND(E) evaluates to 0 is never visited by the algorithm.

Normalizing the Input Program

The basic algorithm is sensitive to presence of copies. For example, if the routine is written as:

```
int addsat (int x, int y) {
    int a=x;
    int b=y;
    int z = a + b;
    if ( SATMIN32 & ( ~(x ^ y) & (a ^ z) ) ) {
        z = SATMAX32 + (b >> 31) & 0x1;
    }
    return z;
}
``` then the basic algorithm fails to identify the saturated use in the return statement, since the basis statement is z=a+b, and there are no references in the code to sign bits of a or b. This difficulty is not unique to our approach. Other program analysis and optimization problems, such as common sub-expression elimination are sensitive to copies, as well.

The solution is to use some form of global value numbering (Ref 8) in order to normalize the input program.

In the present example of implementation, global value numbering and copy propagation are used. Dependence Flow Graphs is used as our intermediate representation (Ref 3). DFG construction coupled with scalar elimination also finds some equivalence between the uses of the variables a and x. In basic form of the invention, the equations can also be solved using well-known iterative techniques (Refs 5,6). Sparse methods based on the static single assignment (SSA) form as well as dependence-flow graphs (DFGs) (Refs 3,4) can be used to reduce time and space complexity of solution.

EXAMPLE 1

Consider the following computation of saturating addition:

```
int addsat (int x, int y) {
    int z = x + y;
    if ( SATMIN32 & ( ~(x ^ y) & (x ^ z) ) ) {
        z = SATMAX32 + (x >> 31) & 0x1;
    }
    return z;
}
```

Figure 2:
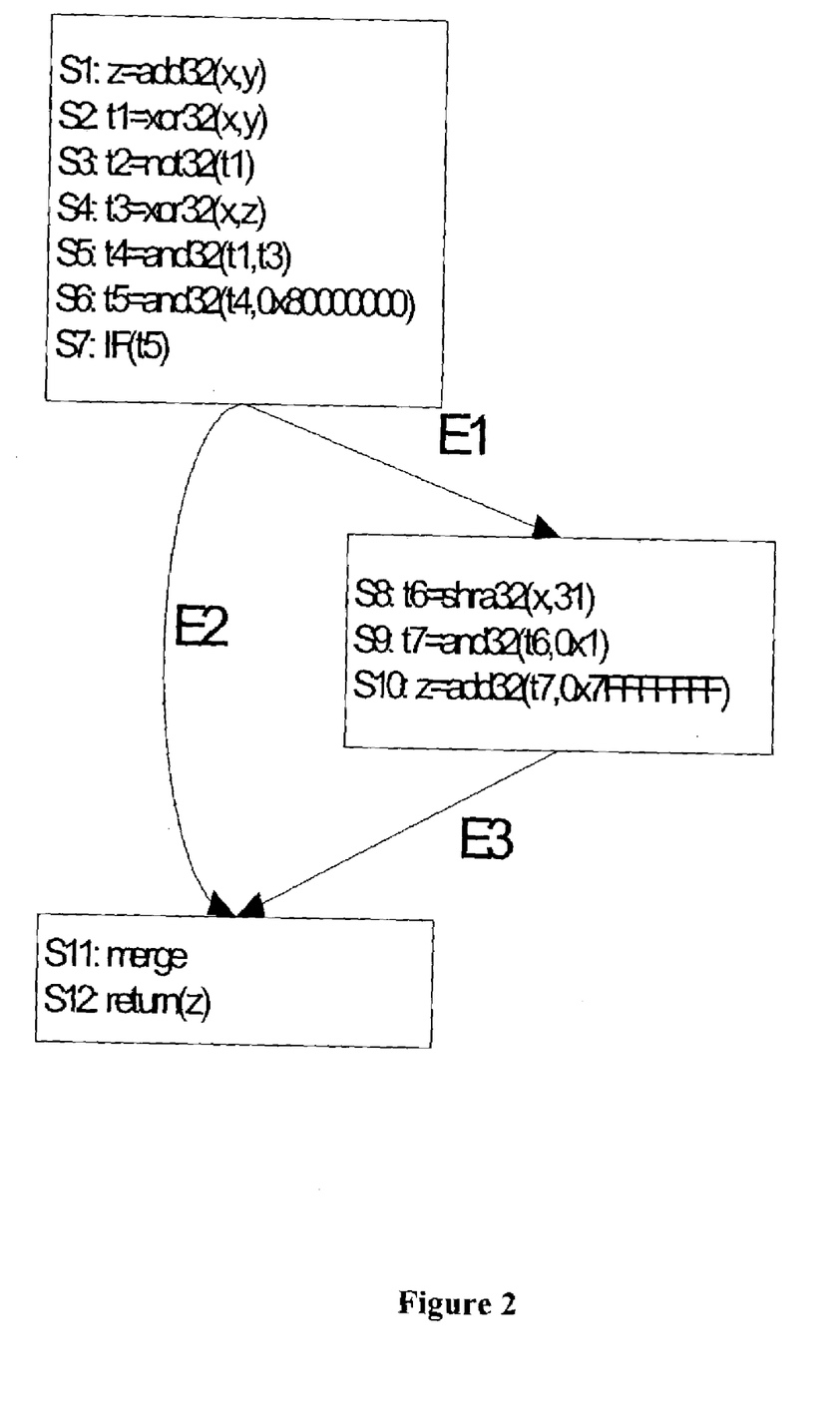
FIG. 2 is a control flow graph of an example add operation using the principles of the present invention.

The intermediate representation is shown in FIG. 2. For brevity, statements have coalesced into basic blocks. The selected values of the properties are:

BITS(IN(S6,t4))=[¬(X⊕Y)∧(X⊕Z), ⊥, ⊥, ..., ⊥]. This is because t4 equals and32 (not32(xor32 (x,y)),xor32 (x,z))

BITS(OUT(S6),t5)=[¬(X⊕Y)∧(X⊕Z), 0, 0, ..., 0], because the statement masked out all the bits but the leftmost.

The true side of the conditional in S7 is taken when $t5 \neq 0$. This is equivalent to the disjunction of the bits of t5, which equals: $\neg(X \oplus Y) \wedge (X \oplus Z)$.

Thus, $COND(E1) = \neg(X \oplus Y) \wedge (X \oplus Z)$ and
$COND(E2) = \neg COND(E1)$
Observe that $\neg(X \oplus Y) \wedge (X \oplus Z) = F_{OF} \wedge F_{UF} = \neg F_N$,
therefore $COND(E_1) = \neg F_N$ and $COND(E_2) = F_N$
$BITS(IN(S10), t7) = [0,0, \ldots, 0, X]$, since t7 equals to and32 (1, shra32(x, 31)).
$BITS(OUT(S10), z) = \underline{add32}([0,0, \ldots, X], [0,1,1, \ldots, 1])$.
Following addition rules:
$BITS(OUT(S10), z) = [X, \neg X, \neg X, \ldots, \neg X]$.

$C_{OF}(OUT(S10),z) = eval(\underline{add32}([0,0, \ldots, 0, X](F_{OF}),$
$[0,1,1, \ldots, 1](F_{OF}))) =$
$eval(\underline{add32}([0,0, \ldots, 0,0], [0,1,1, \ldots, 1])) =$
$eval([0,1,1, \ldots, 1]) = SATMAX_{32}$ $C_{UF}(OUT(S10),z) = eval(\underline{add32}([0,0, \ldots, 0, X](F_{UF}),$
$[0,1,1, \ldots, 1](F_{UF}))) =$
$eval(\underline{add32}([0,0, \ldots, 0, 1], [0,1,1, \ldots, 1])) =$
$eval([1,0,0, \ldots, 0]) = SATMIN_{32}$ $ISZ(OUT(S1), z) = 1$
$ISZ(E_2, z) = 1$
Since $COND(E_3) \wedge F_N = \neg F_N \wedge F_N = \underline{0}$, the ISZ property is propagated from E2 to the output of the S11 merge:
$ISZ(OUT(S11), z) = ISZ(IN(S12), z) = ISZ(E_2) = 1$
Similarly, $C_{UF}$ and $C_{OF}$ are propagated from E3 to the output of the merge. Thus, at the return statement S12:
$C_{OF}(IN(S12), z) = SATMAX_{32}$
$C_{UF}(IN(S12), z) = SATMIN_{32}$
$ISZ(IN(S12), z) = 1$
This establishes that the use of z in S12 is saturated.

EXAMPLE 2

The analysis for the function below illustrates the propagation of the ISZ property:

```
int addsat_5 (int x, int y) {
    int z = x + y;
    int OF=(~x & ~y & z) >> 31;
    int UF=(x & y & ~z) >> 31;
    int N=~(OF | UF);
    return (SATMAX32 & OF) | (SATMIN32 & UF) | (z & N);
}
```

Here is the intermediate representation with some of the expressions unexpanded:
S1: z=add32(x,y)
S2: OF=shra32 (and32 (notx),and32(not (y),z)), 31)
S3: UF=shra32 (and32 (x, and32(y,not (z))), 31)
S4: N=not32 (or32 (OF,UF))
S5: t1=and32 (OF, 0x7fffffff)
S6: t2=and32 (UF, 0x80000000)
S7: t3=and32 (N, z)
S8: t4=or32 (t1, or32 (t2, t3))
S9: return t4

Below are the solutions for some of the properties. For clarity, edge designations have been deleted from the properties, since every variable is defined exactly once:
$BITS(OF) = [F_{OF}, F_{OF}, \ldots, F_{OF}]$,
$BITS(UF) = [F_{UF}, F_{UF}, \ldots, F_{UF}]$,
$BITS(N) = [F_N, F_N, \ldots, F_N]$,
$BITS(z) = [Z, \bot, \bot, \ldots, \bot]$ Observe that $BITS(OF)(F_N) = [\underline{0,0}, \ldots, \underline{0}] = BITS(UF)(F_N)$, since $F_{UF}$ and $F_{OF}$, on one hand, and $F_N$, on the other hand, are mutually exclusive.
$ISZ(z) = 1$
$eval(BITS(N)(F_N)) = 0xffffffff$, therefore the and32 operation in S7 acts as a copy of z into t3 when no overflow and no underflow occurs: $ISZ(t3) = 1$
$BITS(t1) = [0, F_{OF}, F_{OF}, \ldots, F_{OF}]$,
$BITS(t2) = [F_{UF}, 0, 0, \ldots, 0]$
$eval(BITS(t1)(F_N)) = 0$, $eval(BITS(t2)(F_N)) = 0$. Therefore the two or32 operations in S8 just copy the value of t3 to t4 when no overflow and no underflow occurs:
$ISZ(t4) = 1$
Some $C_{OF}$ values:

$C_{OF}(t1) = eval(\underline{and32}(BITS(OF)(F_{OF}), [0,1,1, \ldots, 1]$
$(F_{OF}))) = eval(\underline{and32}([1,1, \ldots, 1],$
$[0,1,1, \ldots, 1])) = eval([0,1,1, \ldots, 1]) =$
$SATMAX_{32}$ $C_{OF}(t2) = eval(\underline{and32}(BITS(UF)(F_{OF}), [1,0,0, \ldots, 0]$
$(F_{OF}))) = eval(\underline{and32}([0,0, \ldots, 0],$
$[1,0,0, \ldots, 0])) = eval([0,0, \ldots, 0]) = 0$ $C_{OF}(t3) = eval(\underline{and32}(BITS(N)(F_{OF}), [Z, \bot, \bot, \ldots,$
$\bot])) = eval(\underline{and32}([0,0, \ldots, 0], [Z, \bot, \bot, \ldots,$
$\bot])) = eval([0,0, \ldots, 0]) = 0$ Informally, $C_{OF}(t4) = or32(MAX_{32}, 0, 0) = MAX_{32}$
Some CUF values:

$C_{UF}(t1) = eval(\underline{and32}(BITS(OF)(F_{UF}), [0,1,1, \ldots, 1]$
$(F_{UF}))) = eval(\underline{and32}([0,0, \ldots, 0], [0,1,1, \ldots,$
$1])) = 0$ $C_{UF}(t2) = eval(\underline{and32}(BITS(UF)(F_{UF}), [1,0,0, \ldots, 0]$
$(F_{UF}))) = eval(\underline{and32}([1,1, \ldots, 1], [0,1,1, \ldots,$
$1])) = eval([1,0, \ldots, 0]) = SATMIN_{32}$ $C_{UF}(t3) = eval(and32(BITS(N)(F_{UF}), [Z, \bot, \bot, \ldots,$
$\bot])) = eval(\underline{and32}([0,0, \ldots, 0], [Z, \bot, \bot, \ldots,$
$\bot])) = eval([0,0, \ldots, 0]) = 0$ Informally, $C_{UF}(t4) = or32(0, SATMIN_{32}, 0) = SATMIN_{32}$ $C_{UF}(t4) = SATMIN32$, $C_{OF}(t4) = SATMAX32$ and $ISZ(t4) = 1$. Therefore, t4 carries the saturated value.

Although the present invention has been described and illustrated in detail, it is to be clearly understood that this is done by way of illustration and example only and is not to be taken by way of limitation. The spirit and scope of the present invention are to be limited only by the terms of the appended claims.

REFERENCES

[1] Alfred V. Aho, Ravi Sethi, Jeffrey D. Ullman, "Compilers, principles, techniques, and tools", Addison-Wesley, 1988
[2] Hans Zima, Barbara Chapman, "Supercompilers for Parallel and Vector Computes", ACM Press, 1991
[3] Richard Johnson, Keshav Pingali, "Dependence Based Program Analysis", In the Proceedings of the ACM SIGPLAN 1993 Conference of Programming Language Design and Implementation (PLDI).
[4] Ron Cytron et al, "An efficient method for computing static single assignment form", In Conference Record of the $_{16}$th Annual ACM Symposium on Principles of Programming Languages.
[5] Partic Cousot, Radhia Cousot, "Automatic Synthesis of Optimal Invariant Assertions: Mathematical Foundations", In the Proceedings of the Symposium on Artificial Intelligence and Programming Languages, 1977.

[6] Gary Kildall, "A Unified Approach to Global Program Optimization", In the Proceedings of the 1973 Symposium on Principles of Programming Languages.

[7] Mark Wegman, F. Kenneth Zadeck, "Constant Propagation with Conditional Branches", In ACM Transaction on Programming Languages and System, vol. 13, No. 2, April 1991, pp. 181–210.

We claim:

1. A method of recognizing full-word saturating addition and subtraction in a program for every basis statement A of the form z=ADD(x,y) or z=SUB(x,y), the method performed on a computer comprising:

inserting the statement $z_{sat}$=ADDSAT(x,y) or $z_{sat}$=SUBSAT(x,y) immediately following the statement A;

computing bits values BITS(E,v) properties of the variable v at edges E in the program;

computing condition COND(E) properties under which the edges E are executed in the program;

computing reach REACH(E,v) properties indicating which values of the variable v reaches a use of variable z in statement S at edges E in the program for overflow or underflow or normal occurrences;

replacing z in a statement S that uses z with the use of $z_{sat}$ if all of the following conditions hold for the statement S: a) the only values of z that reach S cause SATMAX to be assigned to z when overflow has occurred, b) the only values of z that reach S cause SATMIN to be assigned to z if underflow has occurred, and c) the only values of z that reach S are from the basis statement A if no underflow and no overflow has occurred; and removing statements made unnecessary by the replacement of uses of z with $z_{sat}$ in the previous step.

2. The method according to claim 1, including defining overflow, underflow and "normal" predicates for REACH as follows wherein X, Y, Z are the signs of variables x, y, z respectively:

| | Form of the basis statement A | |
|---|---|---|
| Predicate | z = ADD(x,y) | z = SUB(x,y) |
| Overflow condition $F_{OF}$ | $F_{OF} = \neg X \wedge \neg Y \wedge Z$ | $F_{OF} = \neg X \wedge Y \wedge Z$ |
| Underflow condition $F_{UF}$ | $F_{UF} = X \wedge Y \wedge \neg Z$ | $F_{UF} = X \wedge \neg Y \wedge \neg Z$ |
| No overflow and no underflow ("normal") $F_N$ | $F_N = \neg F_{OF} \wedge \neg F_{UF}$ | |

3. The method according to claim 2, wherein the REACH properties include a constant value $C_{OF}(E,v)$ taken by the variable v when the edge E is executed, if overflow had occurred; a constant value $C_{UF}(E,v)$ taken by the variable v when the edge E is executed, if underflow had occurred; and a Boolean flag ISZ(E,v) which indicates whether v carries the same value as the variable z in the basis statement A when the edge E is executed and neither overflow nor underflow had occurred.

4. The method according to claim 1 wherein the occurrences of overflow or underflow or normal is determined as a function of the sign bits of X, Y and Z.

5. The method according to claim 1, including solving the equations using dense techniques.

6. The method according to claim 1, including solving the equations using sparse program representation.

7. The method according to claim 1, wherein the values, properties and conditions are approximated using global data flow analysis, which includes a lattice for approximating BITS, COND, REACH and a system of equations relating approximations to various program points.

8. The method according to claim 7, including compressing of lattice vectors assigned to the variables.

9. In a method of formulation and solving program analysis equations on a computer that facilitate recognition of full word saturating addition and subtraction, the method of formulation comprising, for each basis addition statement z=x+y or subtraction statement z=x−y, formulating data flow equations that describe the following properties of the program statements being analyzed:

a) values BITS of program variables x, y, z as Boolean functions of the sign bits of X, Y and Z;

b) condition COND under which program statements S are executed as Boolean functions of the sign bits of X, Y and Z;

c) condition REACH of which values of the variables reaches a use of variable z in statements S for overflow or underflow or normal occurrences; and replacing z in a statement S of the program that uses z with the use of $z_{sat}$ if and only if all of the following conditions hold for that statement S: 1) the only values of z that reach S assigns cause SATMAX to be assigned to z when overflow has occurred, 2) only values of z that reach S assigns cause SATMIN to be assigned to z if underflow has occurred, and 3) only values of z that reach S are from the basis statement if no underflow and no overflow has occurred.

10. The method according to claim 9, wherein the occurrences of overflow or underflow or normal is determined as a function of the sign bits of X Y and Z.

11. The method according to claim 9, including removing statements made unnecessary by the replacement of uses of z with $z_{sat}$.

12. The method according to claim 9, including solving the equations for BITS, COND and REACH using dense techniques.

13. The method according to claim 9, including solving the equations for BITS, COND and REACH using sparse program representation.

14. The method according to claim 9, wherein the values and conditions are approximated using global data flow analysis, which includes a lattice for approximating BITS, COND, REACH and a system of equations relating approximations to various program points.

15. The method according to claim 14, including compressing of lattice vectors assigned to the variables.

16. The method according to claim 9, wherein REACH includes a constant value $C_{OF}(E,v)$ taken by the variable v when the edge E is executed, if overflow had occurred; a constant value $C_{UF}(E,v)$ taken by the variable v when the edge E is executed, if underflow had occurred; and a Boolean flag ISZ(E,v) which indicates whether v carries the same value as the variable z in the basis statement when the edge E is executed and neither overflow nor underflow had occurred.

* * * * *

UNITED STATES PATENT AND TRADEMARK OFFICE
CERTIFICATE OF CORRECTION

PATENT NO.         : 7,171,438 B2                                        Page 1 of 1
APPLICATION NO.    : 10/382578
DATED              : January 30, 2007
INVENTOR(S)        : Mayan Moudgill and Vladimir Kotylar It is certified that error appears in the above-identified patent and that said Letters Patent is hereby corrected as shown below:

Column 2, line 10, "only values of z that reach S assigns SATMAX to z when"
    should read -- only values of z that reach S assigns SATMAX to v when --

Column 2, lines 11-12, "c) the only values of z that reach S assigns SATMIN to z if underflow has occurred, and d) the"
    should read -- b) the only values of z that reach S assigns SATMIN to z if underflow has occurred, and c) the --

Column 2, lines 13-14, "only values of z that reaches S is from the basis statement A if no underflow and if no"
    should read -- only values of z that reaches S assign z from the basis statement A to v if no underflow and if no --

Column 15, line 27, Claim 1, "to be assigned to z when"
    should read -- to be assigned to v when --

Column 15, line 29, Claim 1, "assigned to z if underflow"
    should read -- assigned to v if underflow --

Column 15, lines 30-31, Claim 1, "only values of z that reaches S is from the basis statement A if no underflow and no overflow has occurred. Finally the"
    should read -- only values of z that reaches S assign z from the basis statement A to v if no underflow if no underflow and no overflow has occurred. Finally the --

Signed and Sealed this

Sixth Day of January, 2009

JON W. DUDAS
*Director of the United States Patent and Trademark Office*